(12) United States Patent
Smith (10) Patent No.: US 8,040,537 B2
(45) Date of Patent: Oct. 18, 2011

(54) ADAPTIVE FORCED BINARY COMPRESSION IN PRINTING SYSTEMS

(75) Inventor: Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1030 days.

(21) Appl. No.: 11/686,529

(22) Filed: Mar. 15, 2007

(65) Prior Publication Data

US 2008/0225327 A1  Sep. 18, 2008

(51) Int. Cl.
*G06F 3/12* (2006.01)
(52) U.S. Cl. ...... 358/1.13; 358/1.2; 358/3.06; 358/3.07; 382/166; 382/232; 382/235; 382/244
(58) Field of Classification Search ............ 358/1.13, 358/1.2, 3.06, 3.07; 382/166, 232, 235, 244
See application file for complete search history.

(56) References Cited

U.S. PATENT DOCUMENTS

| 6,181,435 | B1 * | 1/2001 | Onodera ............... 358/1.14 |
| 6,201,614 | B1 * | 3/2001 | Lin ..................... 358/3.13 |
| 6,337,747 | B1 * | 1/2002 | Rosenthal ............. 358/1.15 |
| 6,583,887 | B1 * | 6/2003 | Clouthier et al. ....... 358/1.15 |
| 6,786,149 | B1   | 9/2004 | Lomoine et al. |
| 6,903,829 | B2 * | 6/2005 | Kuroi ................. 358/1.11 |
| 2004/0042035 | A1 * | 3/2004 | Uejo .................. 358/1.15 |
| 2004/0042036 | A1 * | 3/2004 | Kodera et al. ......... 358/1.15 |
| 2004/0042037 | A1 * | 3/2004 | Uejo .................. 358/1.15 |
| 2004/0042038 | A1 * | 3/2004 | Uejo .................. 358/1.15 |
| 2005/0206948 | A1 * | 9/2005 | Uejo .................. 358/1.15 |

\* cited by examiner

*Primary Examiner* — Chan S Park
*Assistant Examiner* — Jacky X Zheng
(74) *Attorney, Agent, or Firm* — Oliff & Berridge, PLC (57) ABSTRACT

Forced compression halftone processes and forced compression techniques may be used to forcibly compress page raster images passed between a Digital Front End (DFE) processor and a Continuous Feed (CF) printer within a CF printing system. If a DFE processor determines that a compressed image size exceeds a static or dynamically predetermined threshold, the DFE processor may re-render the image using a "forced compression" halftone process, such as 2-to-1 forced compression, 4-to-1 forced compression, reduced resolution, etc. Once the page raster image has been re-rendered, the DFE processor may use a forced compression technique, which is complimentary to the applied "forced compression" halftone process to re-compress the page raster image. The approach allows page raster images to be compressed to meet interface bandwidth constraints associated with the physical interface between the DFE processor and CF print engine, thereby allowing otherwise unprintable jobs to be printed with reasonable quality.

22 Claims, 9 Drawing Sheets

ADAPTIVE FORCED BINARY COMPRESSION IN PRINTING SYSTEMS

BACKGROUND

This disclosure generally relates to Continuous Feed (CF) printing systems that include a processor that receives Page Description Language (PDL) input or other input from a PDL source device or other source device and supplies raster images to a CF printer.

Figure 1:
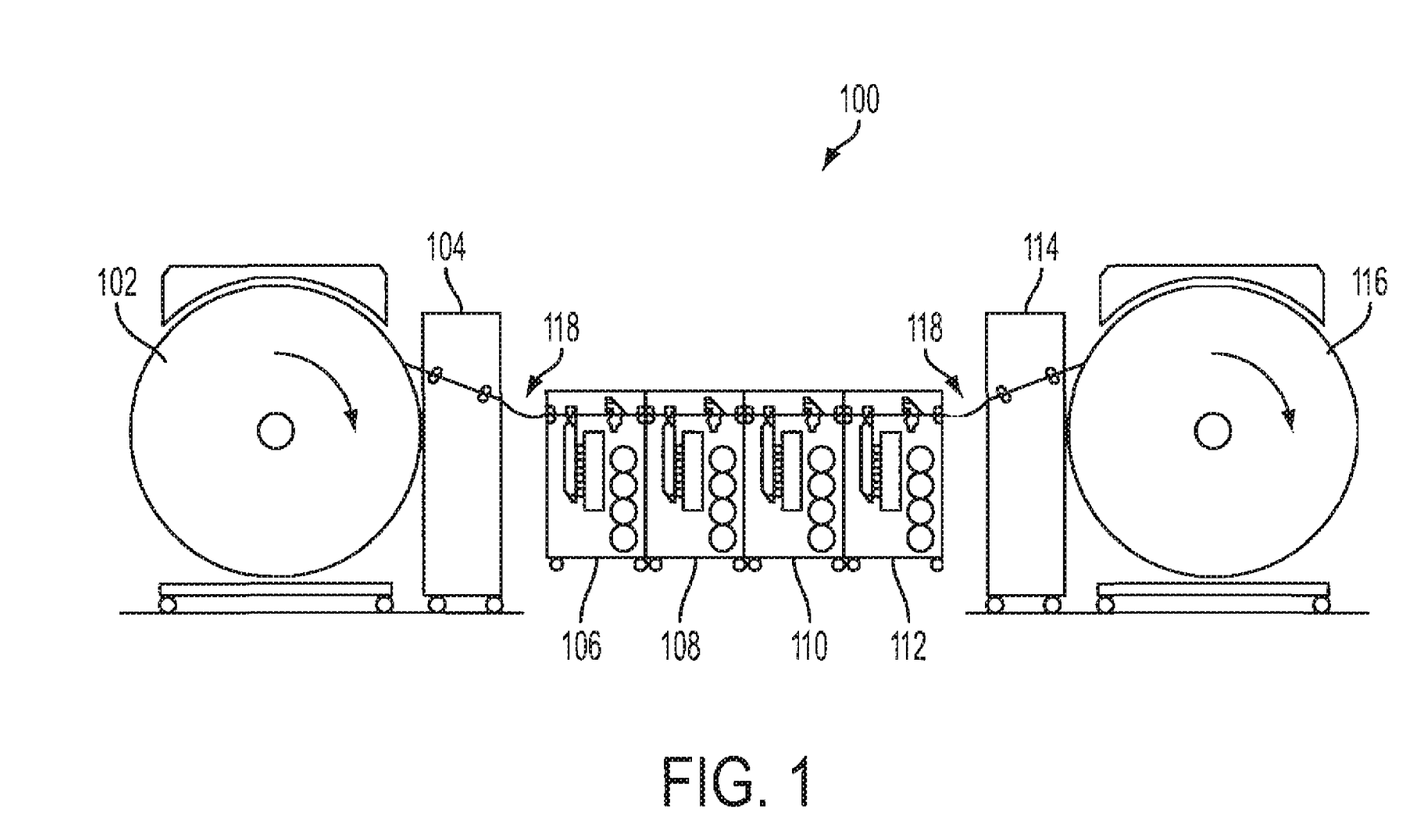
FIG. 1 is a side view in elevation of an exemplary CF printer.

FIG. 1 is a side view of an exemplary CF printer. A CF printer prints on a band or roll of paper as opposed to a sheet printing system that prints on discrete sheets of media. FIG. 1 illustrates a CF printer 100 that incorporates a media input roll 102, media input adapter 104, multiple printing modules 106, 108, 110, and 112, a media output adapter 114 and a media output roll 116. The media input roll 102 comprises a wound-up paper web 118, and the media input roll 102 unwinds as the web of paper 118 is fed by the input adapter 104 to a first printing module 106. The paper web 118 continues to proceed through second 108, third 110 and fourth 112 printing modules. The web 118 continues to be processed through the output adapter 114 that feeds the paper web 118 onto the output roll 116. Any paper cutting required may be performed external to the CF printer illustrated in FIG. 1. Alternatively, the paper web 118 may be fed directly to a cutter after printing, rather than being wound on the output roll 116. Other variations of a CF printer are available, such as the CF printer embodiments described in U.S. Pat. No. 6,786,149, issued to Lomoine et al., the disclosure of which is incorporated herein by reference in its entirety.

Figure 2:
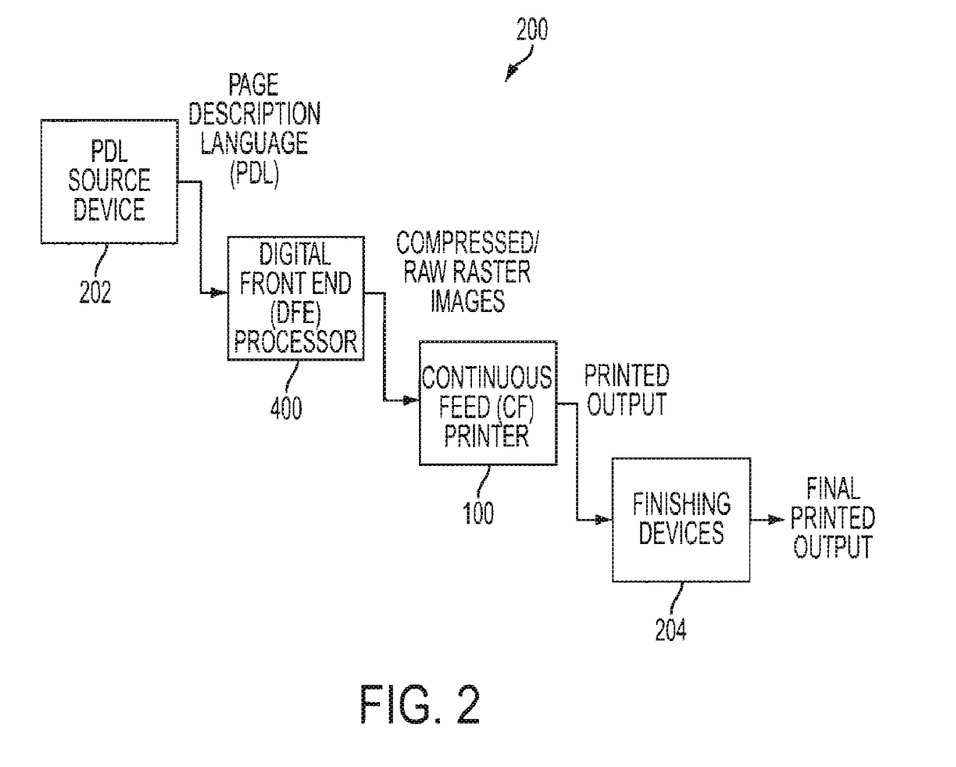
FIG. 2 is a system level block diagram of the exemplary CF printer of FIG. 1 in an operational configuration with supporting equipment.

FIG. 2 is a system level block diagram of an exemplary CF printing system 200 which may include a PDL source device 202, a Digital Front End (DFE) processor 400, an exemplary CF printer 100, as described above with respect to FIG. 1, and printed material finishing devices 204.

As shown in FIG. 2, DL source device 202 may generate page data that describes a page to be printed using PDL. For example, the page to be printed may be described using a PDL based on, for example, the Adobe Postscript standard, or another standard. The PDL description of the page may be passed by PDL source device 202, via a direct or network-based connection, to DFE processor 400.

DFE processor 400 may process the PDL page description for each page to produce a raster image of each page to be printed that may be passed to CF printer 100 for printing. Processing performed by DEE processor 400 for each page of PDL may include several steps. First, DFE processor 400 may raster image process (RIP) the PDL page description received for each page to be printed to generate a set of page objects, e.g., rectangles, letters, bitmaps, etc., and coordinates for arranging each of the respective page objects on the page to be printed. Second, DFE processor 400 may render the set of generated objects for each page to be printed using a selected halftoning process to produce a rendered halftoned raster image, as addressed in greater detail below. Third, DFE processor 400 may compress the halftoned raster image. Fourth, DFE processor 400 may transmit either a compressed, or an uncompressed, halftoned raster image to a CF printer 100 for each page to be printed.

CF printer 100 may receive a halftoned raster image, decompress the received raster image if the image was previously compressed, and then print the raster image on web of paper 118 passing through CF printer 100, as described above with respect to FIG. 1. CF printer 100 may then pass the printed output on web of paper 118 to one or more finishing devices 204.

The finishing devices 204 may receive the stream of printed output on the web of paper 118, and may cut, collate, fold and/or otherwise process the web of paper 118 to produce a printed product. Such product may include newspapers, magazines, pamphlets, and/or any other printed material. These printed products may be further processed by hand and/or by additional specialized finishing equipment to meet the needs of the final product.

An exemplary CF printing system 200, as described above, may generate printed output with a page-per-minute output rate of many hundreds of pages per minute. To support such high printed page rates, media input roll 102 and media output roll 116 may rotate in locked phase to supply web of paper 118 passing through CF printing 100 to support web feed rates of many hundreds of feet per minute. By rotating at rates sufficiently high to supply web of paper 118 to CF printing 100, both media input roll 102 and media output roll 116 develop significant rotational momentum.

DFE processor 400 supplies halftoned raster images to the CF printer 100 at an average rate that matches the page-per-minute throughput of the CF printer. A CF printer operates continuously on the principle that an image will always be available for output to the continuous web of paper 118 passing through the printer. The pages of a print job may have relative positions with respect to one another on web of paper 118, so that as the printed output is processed by the respective finishing devices, the pages of the final printed output are properly collated. For this reason, the CF printer 100 cannot accommodate a skip of one or more images in the stream of raster images received from DFE processor 400.

Therefore, should DFE processor 400 fail to deliver halftoned raster images to the CF printer 100 at a sufficiently high average rate, raster image storage buffers in CF printer 100 may become depleted of all images, resulting in an error condition referred to as "clutching" During a clutching process, the CF printer terminates the current print job and engages clutches, or brakes, to slow media input roil 102 and media output roll 116.

Given that CF printer 100 operates at such high speeds, such a termination, mid-stream of a print job, may result in damage, e.g., stretching and/or tearing of web of paper 118 and/or a failure to fuse toner on portions of web of paper 118. Recovery from such a clutching operation involves a lot of human interaction in order to clean up CF printer 100, to reinitiate CF printer 100 for a second printing process and to correlate and fuse the printed output of the separately initiated runs.

To avoid clutching, the processes executed by DFE processor 400 to generate raster images for transfer to CF printer 100, the physical interface, e.g., optical cables, point to point Ethernet, etc., between DFE processor 400 and CF printer 100, and the raster image buffer maintained by CF printer 100, may be configured to assure that DFE processor 400 can supply a stream of raster images at a rate that supports the throughput rate of the CF printer.

Due to marketplace constraints, the processing speed of DFE processor 400, the throughput capacity of the physical interface between DFE processor 400 and CF printer 100, and the storage capacity of image buffers in CF printer 100, etc., all have finite capacities. Therefore, despite efforts to design a system in which clutching is less likely to occur, operational conditions may still arise that result in clutching of CF printer 100. Often, the physical interface between DFE processor 400 and CF printer 100 is the principal bottleneck.

For example, if a print job includes a large number of pages that do not compress well, the physical interface between DFE processor 400 and CF printer 100 may be required to pass a large number of larger-than-average files. Such an occurrence may result in a reduction in the average page-per-minute transfer rate of page raster images from DFE processor 400 to page raster image storage buffers in CF printer 100. Should the average page-per-minute transfer rate of page raster images into the CF printer page raster image storage buffers fall below the page-per-minute output rate of the CF printer, a net reduction in the number of page raster image files stored in the CF printer's page raster image storage buffers will occur. Should such conditions continue for a period of time longer than that planned for when the total page storage capacity of the page raster image storage buffers in the CF printer system configuration was established, the CF printer's storage buffers may become depleted of page raster image files, thereby forcing CF printer 100 to clutch.

SUMMARY

Hence, a need remains for approaches that further reduce the likelihood of clutching in CF printing systems. Preferably, such an approach would be able to reduce the likelihood of clutching without requiring increases in the processing speed and, or physical storage capabilities and/or interface bandwidth capabilities of DFE processor 400 and CF printer 100. Further, such an approach would preferably be capable of reducing the likelihood of clutching despite variations in CF printing system configurations and print job characteristics.

CF printer clutching occurs when the average pace-per-minute throughput from DFE processor 400 to CF printer 100 falls below the page-per-minute throughput of CF printer 100 for a sufficiently long period of time to deplete a store of page raster images stored in page raster image buffers of CF printer 100. Such a condition may arise if the size of the raster images generated by DFE processor 400 are, on average, too large to pass through the physical interface between DFE processor 400 and CF printer 100 at a sufficiently high average page-per-minute rate, thereby resulting in a depletion of page raster images available to CF printer 100. In effect, the speed of CF printer 100 outpaces the rate at which DFE processor 400 is able to provide images to CF printer 100 via a DFE to CF printer interface of limited bandwidth.

As addressed above, in printing system 200, DFE processor 400 generates compressed binary images for CF printer 100 to decompress and print. Such an approach reduces the data transfer load on the physical interface between the DFE processor 400 and CF printer 100 and increases the average page-per-minute transfer rate across the interface, when compared with an uncompressed transfer approach. However, it is often the case that severely halftoned images will expand in size during the compression operation. Transferring such expanded files over the physical interface between the DFE processor 400 to CF printer 100 results in a reduced page-per-minute transfer rate, which can lead to clutching, as addressed above. Today, the problem is handled by aborting the compression operation and having DFE processor 400 provide CF printer 100 with uncompressed page raster images.

However, to assure with high confidence the ability to print all possible print jobs using such an approach, the physical interface between DFE processor 400 and CF printer 100 must be scaled to support the transfer of an indefinite series of uncompressed images. For example raster image storage buffer on the CF printer 100 side of the physical interface may be increased and the speed of the physical interface may be increased to support a heightened worst case operational scenario. However, increasing the physical capacity of CF printing system 100 in such a manner may significantly increase the cost of a CF printing system.

Unless the physical interface between DFE processor 400 and CF printer 100 is scaled in such a manner, DFE processor 400 will be unable to supply CF printer 100 with images at a high enough rate to prevent the CF printer 100 from clutching, resulting in serious productivity and image quality issues. However, to reduce the cost of CF printing systems, rather than scaling the systems to accommodate an indefinite series of uncompressed images, the CF printing systems are sufficiently scaled only to print indefinite length jobs in which the average page raster image compression ratio is no worse than an engineering design target (e.g. 5-to-1). Unfortunately, in such CF printer systems in which the system components are scaled to avoid clutching based on a 5-to-1 compression ratio of page raster images passing from DFE processor 400 to CF printer 100, print jobs that, on average, compress worse than 5-to-1, e.g., 4-to-1, or 3-to-1, are unprintable due to the likelihood of clutching.

Embodiments described in the present application use an approach that expands the types of print jobs that may be handled, without clutching, by a printing system in which the system components have not been scaled to accommodate an indefinite series of uncompressed images between, DFE processor 400 and CF printer 100. For example, in exemplary embodiments, if while compressing a binary image, DFE processor 400 determines that the compressed image size has exceeded a static or dynamically predetermined threshold, DFE processor 400 may use retained raster image processed page objects to re-render the image using a "forced compression" halftone process, e.g., such as 2-to-1 forced compression, 4-to-1 forced compression, reduced resolution, etc. Once the page raster image has been re-rendered, DFE processor 400 may use a forced compression technique that is complimentary to the "forced compression" halftone process used to regenerate the page raster image, to re-compress the page raster image.

The force compression processes may forcibly "recompress" the re-rendered page raster images by throwing away scanlines and replacing them with standard "line repeat" codes. The resulting forced compressed image file size is considerably smaller than that of an uncompressed image. A CF printer 100 may decompress the compressed image by honoring the "line repeat" codes. The resulting image quality of the decompressed image within CF printer 100 may be superior to standard forced compression techniques by virtue of the fact that the image was re-rendered with a selected forced compression halftone process in preparation for application of a selected forced compression process.

The DFE processor 400 may calculate the compression threshold uniquely for every page to be compressed, based on the actual file sizes of pages already compressed, and on the sustained physical interface bandwidth between DFE processor 400 and CF printer 100 and the print engine image buffer size. This technique allows the DFE processor 400 to adaptively determine how much to compress a given page raster image to avoid clutching the CF printer 100. In cases where an isolated page raster image has poor compression, or even expansion in response to an applied standard compression, the DFE processor 400 does not need to forcibly compress that image. Instead, the DFE may pass the poorly compressed image or a raw version of the image. However, if the same image appears "next to" other poorly compressing images, such that the average compression ratio may exceed the threshold compression ratio for an extended period of time, the DFE may forcibly compress that image, and possibly the adjacent ones, in order to avoid having the average compression ratio exceed the threshold compression ratio for an extended period of time, and thus deplete the page raster image buffers in CF printer 100.

Although the described forced compression halftone processes and forced compression techniques may be characterized as visually lossy binary compression techniques, which in isolation would be undesirable, the described techniques allow otherwise unprintable jobs to be printed with reasonable image quality on a system, that for cost reasons, does not have a physical interface scaled to allow printing an indefinite stream of uncompressed images.

In CF printing systems, it is not possible to "skip pitches". If the DFE cannot deliver an image across the physical interface in time, the CF printer's print engine may clutch, resulting in a severe reduction of printing performance and severe image quality, as addressed above.

The forced compression halftone processes and forced compression techniques described below provide a way of forcing compression to meet the physical interface bandwidth constraints, thereby allowing otherwise unprintable jobs to be printable. Prior to the techniques described in the present application, images were rendered with standard halftones, and when such images were forcibly compressed by throwing away scanlines, the resulting image quality was exceptionally poor. The forced compression halftoning approach described in the present application generates a rendered page raster image with rendered halftone cells in which the individual pixels are grouped in anticipation of forced compression. As a result, the image quality of the final compressed file is better than that achieved with standard approaches, because there is no corruption of the specially rendered halftone cell when forced compression is applied to the binary image.

BRIEF DESCRIPTION OF THE DRAWINGS

Exemplary embodiments will be described with reference to the accompanying drawings, wherein like numerals represent like parts, and in which.

DETAILED DESCRIPTION OF EMBODIMENTS

Figure 3:
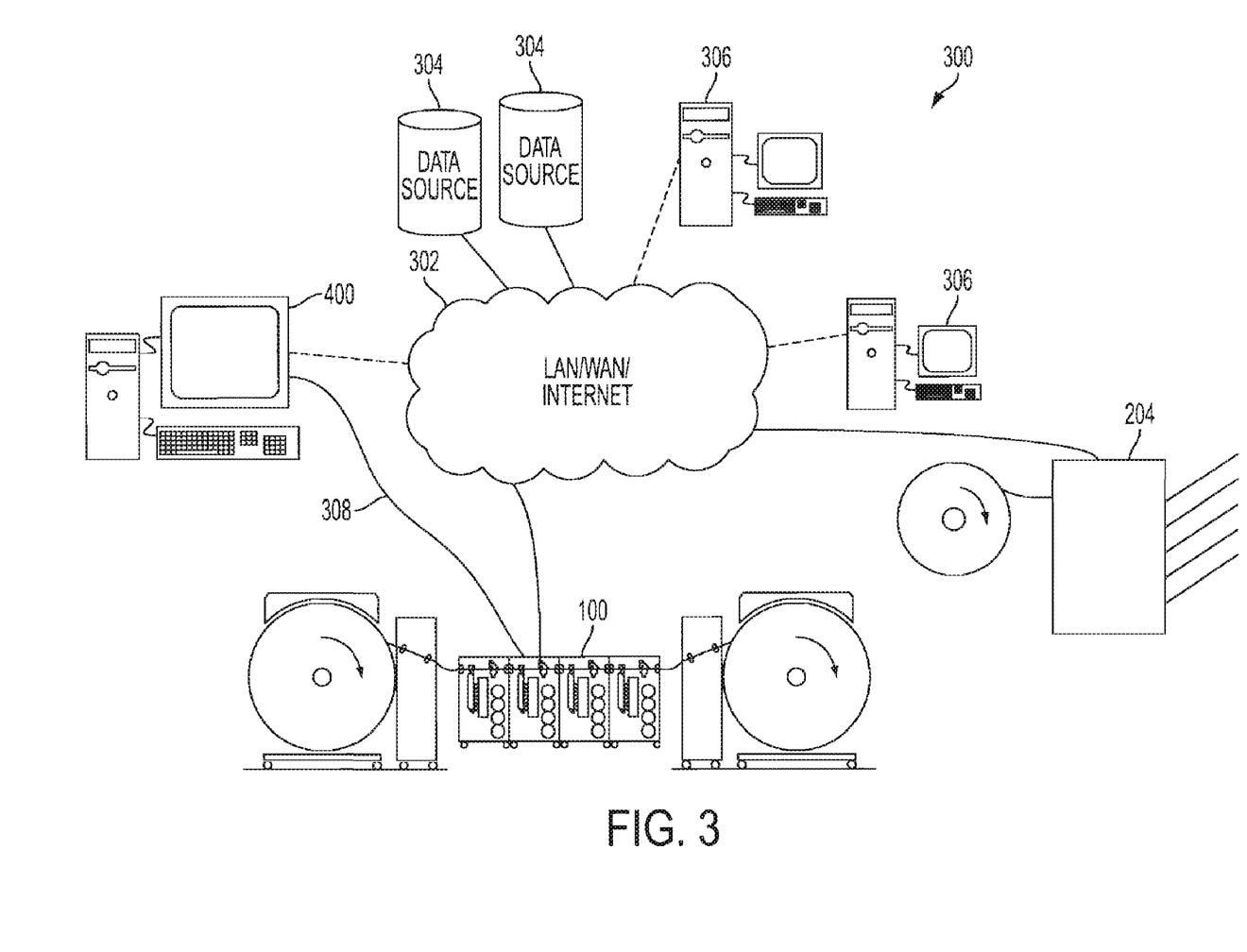
FIG. 3 is a schematic of an exemplary network that provides communication connectivity between an exemplary PDL source device, a DFE processor and a CF printer.

FIG. 3 is a schematic of an exemplary network 300 that provides communication connectivity between components of an exemplary CF printing system. As shown in FIG. 3, LAN/WAN/Internet network 302 may provide connectivity between one or more PDL source devices (described in more detail below), a DFE processor 400, a CF printer 100, and one or more finishing devices 204. For example, a finishing device 204, such as a device that cuts and sorts and/or stacks printed sheets, may be connected directly to DFE processor 400, and/or via network 302 to either DFE processor 400 and/or host computers, to receive control parameters for performing finishing of printed output produced by CF printer 100. In the depicted embodiment, an output roll, when fully wound, is removed from the CF printer 100 and physically moved to the finishing device 204, and then the printed paper web is unwound and fed into the finishing device. However, in other embodiments, the printed paper web may be fed directly into the finishing device 204 from the CF printer 100.

FIG. 3 shows DFE processor 400 as connected to CF printer 100 via a direct physical interface 308. Such a physical interface between DFE processor 400 and CF printer 100 is typical due to the dedicated nature of the interface and the need for reliable, high speed data throughput so that DFE processor 400 may pass raw and compressed page raster images to CF printer 100 at print engine rates. However, DFE processor 400 and CF printer 100 could alternatively be connected via a network, so long as a required level of high-speed bandwidth can be reliably sustained without substantially degrading the performance of the network. Further, a network connection to CF printer 100 may be used for status and monitoring of CF printer 100.

The PDL source devices may include one or more host computers 306, each capable of generating and transmitting to DFE processor 400 via network 302 a print job written, for example, in a PDL. Further, PDL source devices may include one or more data storage devices 304 that may receive a print job from a host computer 306 for storage, and later transmit the stored PDL print job to DFE processor 400 for processing, in response to, for example, a polling request initiated from DFE processor 400. In such a configuration, DFE processor 400 may receive print jobs submitted from PDL source devices located at either local or remote facilities, thereby allowing CF printer 100 to be shared by users, in different printing groups, distributed throughout an organization.

Figure 4:
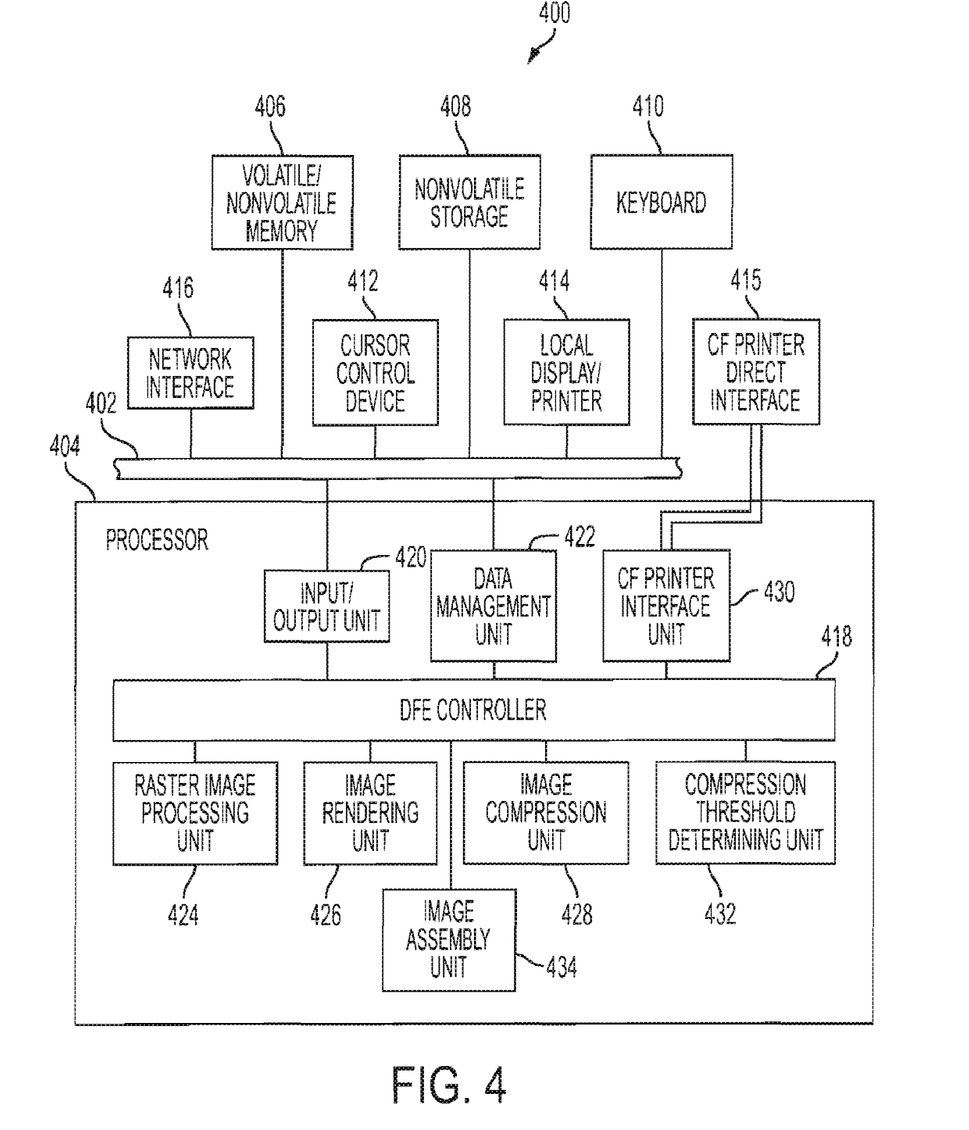
FIG. 4 is a system level block diagram of an exemplary DFE processor.

FIG. 4 is a system level block diagram of an exemplary DFE processor 400. As shown in FIG. 4, a DFE processor 400 used to receive and process PDL print jobs may include a computer system data bus 402 that allows a processor 404 to communicate with, and exchange information with hardware components of the computer such as: volatile/non-volatile memory 406, which allows the processor 404 to store program instructions in local memory for execution and to store and maintain temporary data necessary for execution of the stored program instructions; nonvolatile storage 408, which allows processor 404 to access and retrieve larger bodies of data and program instructions for later execution by the processor; keyboard 410, anchor a cursor control device 412 that allow the processor to receive user instructions and/or information and/or feedback; network interface 416 which allows processor 404 to communicate with and exchange information with PDL source devices and other network devices over a LAN/WAN/Internet network as described above with respect to FIG. 3; and display/printer 414 which allows processor 404 to format and present reports to an operator of DFE processor 400.

As further shown in FIG. 4, processor 404 may include internal components which allow the processor to communicate with the above-described hardware components to send and receive data and instructions over system bus 402. Such components may include: a controller 418 capable of communicating with and controlling an input/output unit 420 that manages communication exchanges with the system bus 402; and a data management unit 422, which allows the controller to maintain a local set of control parameters such as counters, pointers, and segments of executable program instructions for execution.

For example, when provided with executable instructions for processing a PDL print job, as described above, controller 418 may, in accordance with instructions/commands received from a user, retrieve and initiate control parameters/pointers for the execution of program instructions related to processing the PDL print job. For example, at startup, controller 418 may retrieve and load program instructions from nonvolatile storage 408 into volatile/nonvolatile memory 406 for execution and may maintain control parameters in data management unit 422 for use in controlling the simultaneous and/or sequential execution of the program instructions retrieved for execution. In this manner, processor 404 may establish, based on stored program instructions retrieved for execution from nonvolatile storage 408, such as a hard-drive and/or firmware storage: (1) a raster image processing unit 424 that processes the received PDL to produce page objects, e.g., a rectangles, a letters, a bitmaps, etc., and coordinates for arranging each of the respective page objects on the page to be printed, based on the PDL page description received for each page to be printed; (2) an image assembly unit 434 that may assemble several page raster images into a larger sheet image via a post-RIP imposition technique; (3) an image rendering unit 426 that may process objects generated for each page, or may process objects assembled from several pages by image assembly unit 434 into a larger sheet, using a selected halftoning process to produce a halftoned page raster image, as addressed in greater detail below; (4) an image compression unit 428 that may compress the halftoned raster image so that the size of the compressed raster image file is below a predetermined threshold, as addressed in greater detail below; (5) a CF printer interface unit 430 to control the stream of compressed and/or raw image data transmitted via CF printer direct interface 415 to CF printer 100 for printing; and (6) a compression threshold determining unit 432 that receives information related to actual performance status, e.g., actual page raster image compression ratios, actual DFE processor 400 to CF printer 100 transfer rates, actual CF printer buffer status, and actual CF printer output rates, and determines an average compression ratio that should be achieved in order to reduce the likelihood that clutching may occur.

Figure 5:
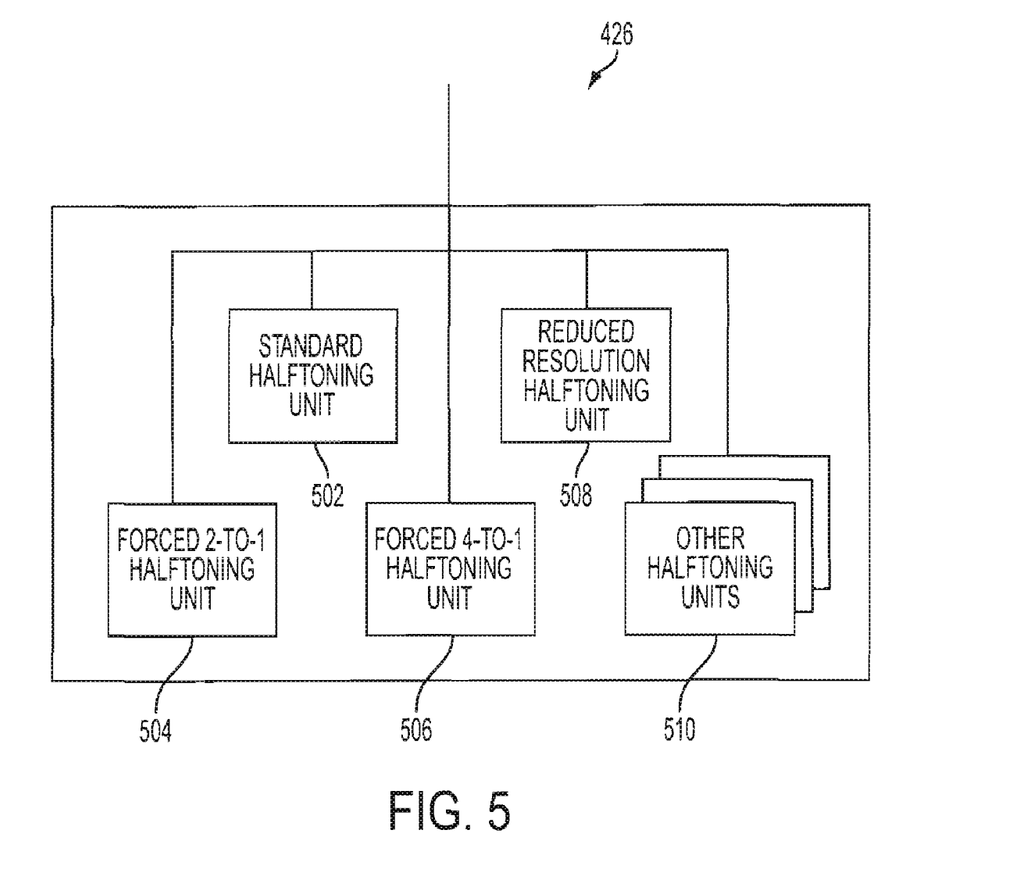
FIG. 5 is a system level block diagram of an exemplary rendering unit within the exemplary DFE processor shown in FIG. 4.

FIG. 5 is a system level block diagram of exemplary rendering unit 426 within the exemplary DFE processor 400 of FIG. 4. As shown in FIG. 5, rendering unit 426 may include: (1) a standard halftoning unit 502 that may be used by rendering unit 426 to render a page of generated objects using a selected standard halftoning process to produce a rendered standard halftoned raster image with characteristics compatible with a selected standard compression algorithm, as addressed in greater detail below; (2) a forced 2-to-1 halftoning unit 504 that may be used by rendering unit 426 to render a page of generated objects using a forced 2-to-1 halftoning process to produce a rendered forced 2-to-1 halftoned raster image that has characteristics compatible with a selected forced 2-to-1 compression algorithm as addressed in greater detail below; (3) a forced 4-to-1 halftoning unit 506 that may be used by rendering unit 426 to render a page of generated objects using a forced 4-to-1 halftoning process to produce a rendered forced 4-to-1 halftoned raster image that has characteristics compatible with the described forced 4-to-1 compression algorithm, as addressed in greater detail below; (4) a reduced resolution halftoning unit 508 that may be used by rendering unit 426 to render a page of generated objects using, a reduced resolution halftoning process; and (5) one or more other halftoning units 510 that may be used by rendering unit 426 to render a page of generated objects to produce a rendered page raster image that has characteristics compatible with one or more selected compression algorithms, as addressed in greater detail below.

Figure 6:
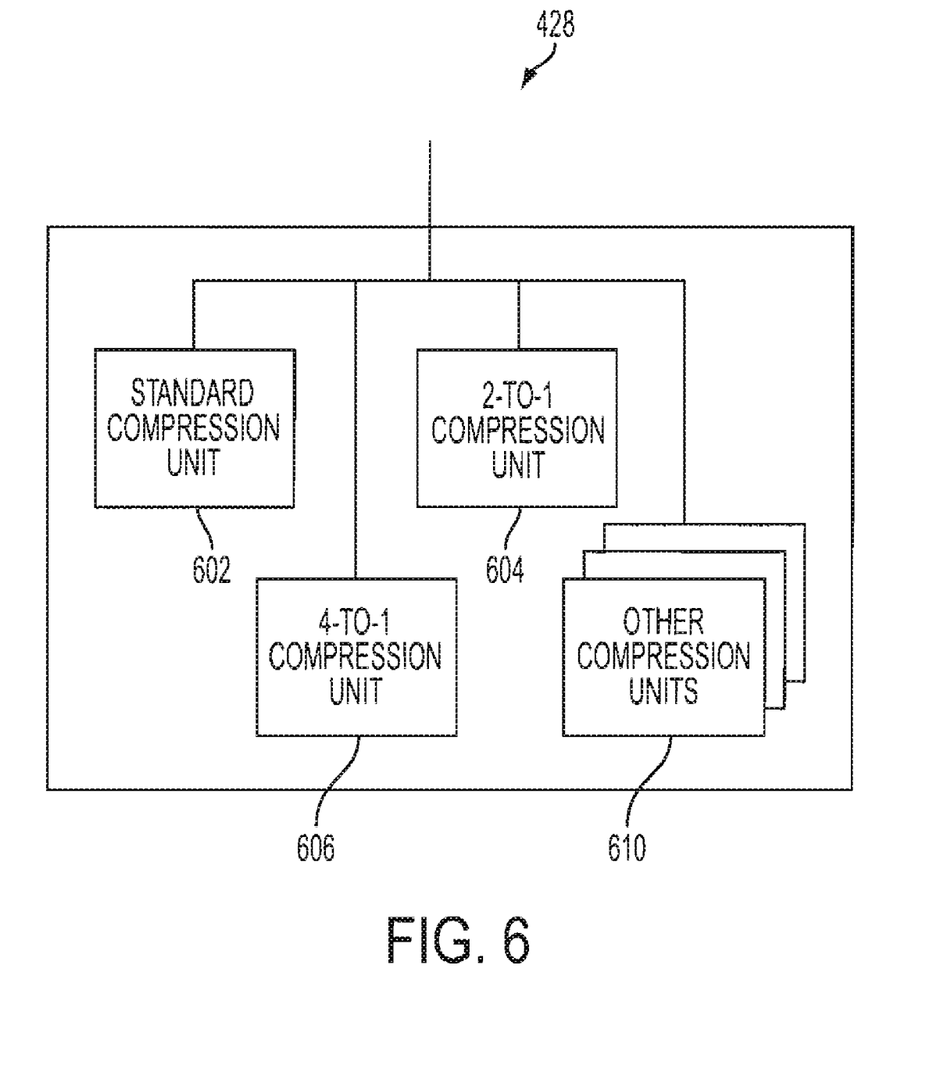
FIG. 6 is a system level block diagram of an exemplary data compression unit within the exemplary DFE processor shown in FIG. 4.

FIG. 6 is a system level block diagram of an exemplary image compression unit 428 within the exemplary DFE processor 400 shown in FIG. 4. As shown in FIG. 6, image compression unit 428 may include: (1) a standard compression unit 602 that may be used by image compression unit 428 to compress a standard halftoned raster image, e.g., a rendered raster image produced with a selected standard halftoning process provided by standard halftoning unit 502, as addressed above, to produce a compressed standard halftoned image; (2) a forced 2-to-1 compression unit 604 that that may be used by image compression unit 428 to compress a forced 2-to-1 halftoned raster image, e.g., a rendered raster image produced with a selected forced 2-to-1 halftoning process provided by forced 2-to-1 halftoning unit 504, as addressed above, to produce a compressed forced 2-to-1 halftoned image; (3) a forced 4-to-1 compression unit 606 that may be used by image compression unit 428 to compress a forced 4-to-1 halftoned raster image, e.g., a rendered raster image produced with a selected forced 4-to-1 halftoning process provided by forced 4-to-1 halftoning unit 506, as addressed above, to produce a compressed forced 4-to-1 halftoned image; and (4) other compression units 610, each capable of compressing one or more halftoned and/or reduced resolution raster images e.g., a rendered raster image produced with a selected reduced resolution halftoning process provided by reduced resolution halftoning unit 508 or a rendered raster image produced with a selected other halftoning process provided by one of other halftoning units 510, as addressed above to produce a compressed image. As addressed below, the compression process, described above, preferably produces a compressed page raster image with a compression ratio that is greater than, or equal to, either a predetermined static compression threshold or a dynamically predetermined compression threshold determined by, for example, compression threshold determining unit 432.

Figure 7:
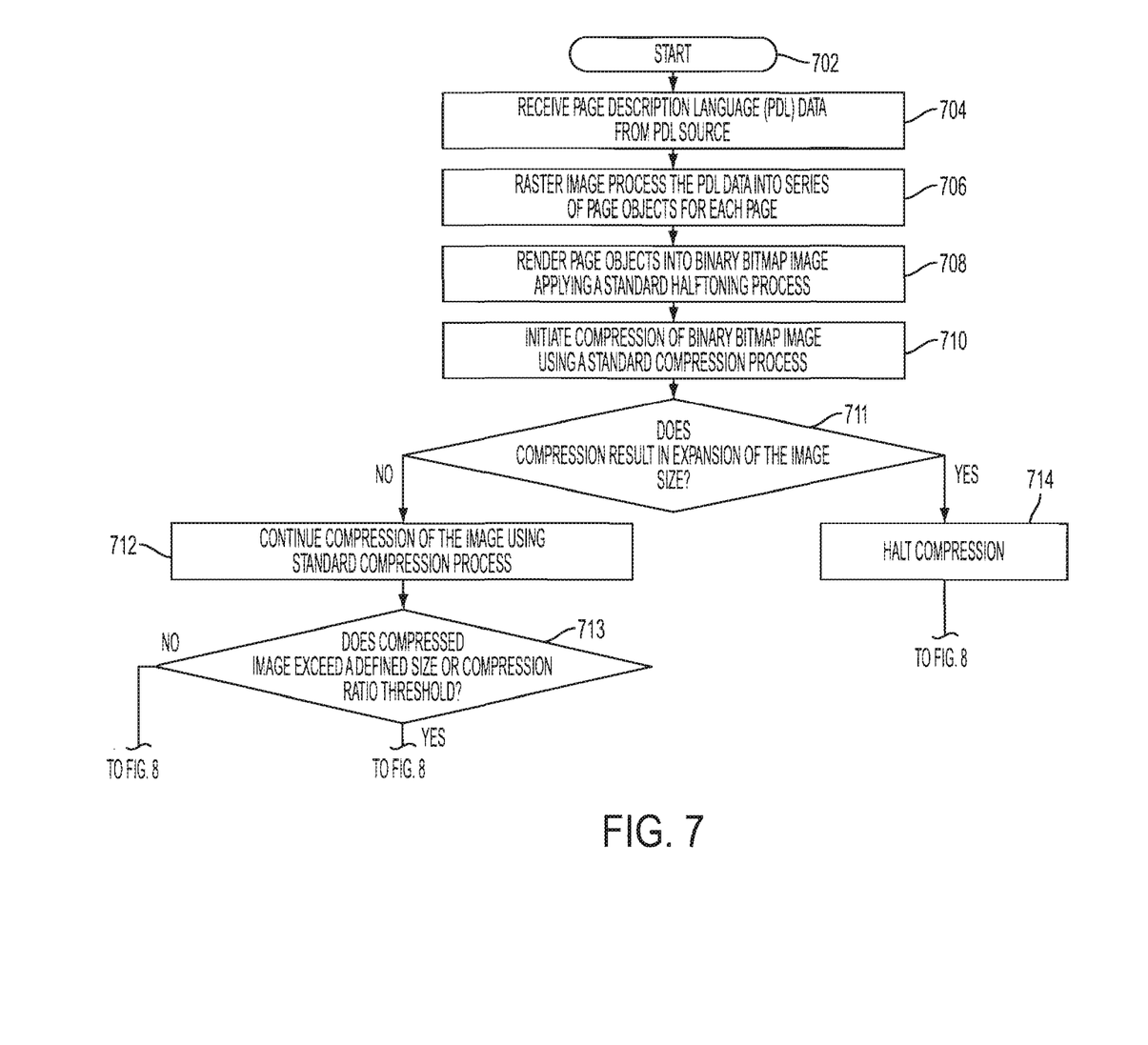
FIG. 7 and FIG. 8 are a flow diagram representing an exemplary method for providing a CF printer with a continuous stream of compressed and/or raw images for printing.
Figure 8:
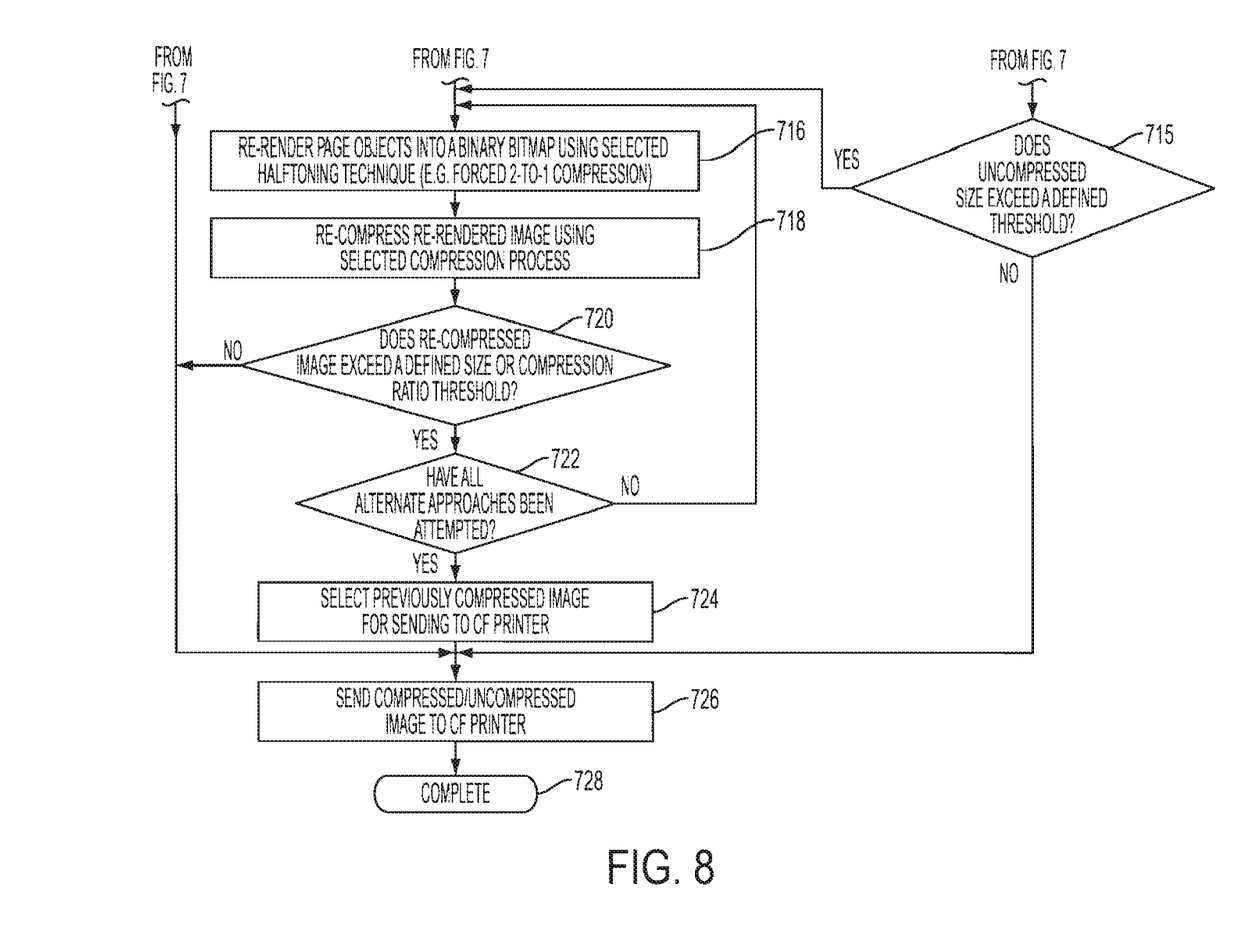

FIG. 7 and FIG. 8 are a flow diagram representing exemplary methods for providing a CF printer 100 with a continuous stream of compressed and/or raw images from DFE processor 400 over a physical interface connecting DFE processor 400 and CF printer 100, as addressed above.

As shown in FIG. 7 and FIG. 8, the described process begins at step S702 and proceeds to step S704.

In step S704, PDL page data that describes a page to be printed is received by the DFE processor from a PDL source device, and operation of the method continues to step S706.

In step S706, the DFE processor raster image processes the received PDL page data into a series of page objects for the page to be printed, as described above with respect to FIG. 2, and operation of the method continues to step S708.

In step S708, the DFE processor renders the page objects for a page into a halftoned binary image by applying a predetermined standard halftoning process, e.g., as provided by standard halftoning unit 502, described above, and operation of the method continues to step S710.

In step S710, the DFE processor initiates compression of the page raster image by applying a standard compression process, e.g., as provided by standard compression unit 602, as described above, and operation of the method continues to step S711.

If, in step S711, the DFE processor determines that the applied standard compression process is resulting in a reduction of the image size, operation of the method lumps to step S712.

In step S712, compression of the image continues using the applied standard compression process. On completion of the compression process, operation of the method jumps to step S713.

If, in step S713, the DFE processor determines that the compressed raster image file meets or exceeds a predetermined compression threshold or is below a maximum compressed image target file size threshold, e.g., provided by compression threshold determining unit 432, as described above, operation of the method jumps to step S726. Otherwise, if, in step S713, the DFE determines that the compressed raster image file has not achieved a predetermined compression threshold, or exceeds a compressed image file size threshold, operation of the method continues to step S716, as addressed below.

Returning now to the decision making step in step S711, if, in step S711 the DFE processor determines that the applied standard compression process is resulting in an expansion of the image size, operation of the method jumps to step S714.

In step S714, compression of the image is stopped and operation of the method jumps to step S715.

If, in step S715, the DFE processor determines that the uncompressed image is below a maximum image target file size threshold, operation of the method jumps to step S726. Otherwise, if, in step S715, the DFE processor determines that the uncompressed image is above a maximum image target file size threshold, operation of the method jumps to step S716 for re-rendering and recompression, as described below.

In step S716, the DFE re-renders the page objects for the page into new binary bitmap image by applying an alternate selected halftoning technique. For example, controller 418 may instruct image rendering unit 426 to render the current page objects using any of the halftoning processes described above with respect to FIG. 5, and operation of the method continues to step S718.

In step S718, the DFE re-compresses the re-rendered image using a selected alternate compression process and stores the resulting compressed page raster image for possible transmission to CF printer 100. For example, controller 418 may instruct image compressing unit 428 unit to compress a halftone image produced using any of the halftoning processes described above with respect to FIG. 5 using a corresponding compression process described above with respect to FIG. 6. Operation of the method then continues to step S720.

If, in step S720, the DFE determines that the recompressed raster image file size meets or exceeds a predetermined compression threshold or is below a maximum compressed image target file size threshold, operation of the method continues to step S726. Otherwise, if, in step S720, the DFE determines that the recompressed raster image file does not achieve a predetermined compression threshold, or that it exceeds a compressed image target file maximum size threshold, operation of the method continues to step S722.

If, in step S722, the DFE determines that not all alternate page rendering and/or page compression processes have been attempted, operation of the method returns to step S716, and a different page rendering and/or page compression process is implemented. Otherwise, if, in step S722, the DFE determines that all alternate page rendering and/or page compression processes have been attempted, operation of the method continues to step S724.

In step S724, DFE may select an image, previously compressed and stored during step S718, for sending to CF printer. For example, controller 418 may select a previously stored compressed page raster image that has the smallest size, and operation of the method continues to step S726.

In step S726, controller 418 may initiate a transfer of the selected page raster image via CF printer interface unit 430 and operation of the method continues to step S728, at which point the above-described process is complete.

As addressed above, compression threshold value may be represented, for example, as a maximum compressed raster image file size, or a minimum file compression ratio. The threshold maximum compressed raster image file size and/or minimum compression ratio may be determined based on actual performance status parameters, such as: (1) an actual measurement of the data transfer rate across the physical interface between DFE processor 400 and CF printer 100, possibly measured in bits per second; (2) a number of page raster images capable of being stored in the CF printer's print mage buffers; (3) CF printer page-per-minute output rates; and/or (4) anticipated page raster image features, e.g., size and content of the raw image files to be compressed.

The compression threshold determining unit 437 may determine a compression threshold value that should be achieved in order to reduce a likelihood that clutching may occur due to depletion of the image files stored in the CF printer's storage buffers during execution of an indefinitely long print job, based on monitored status parameters of the CF printing system, such as those identified above.

In an exemplary CF printing system that supports a static compression threshold value, the threshold value may be based on the speed of the physical interface between the DFE processor 400 and CF printer 100, an expected average raw image file size, and the CF printer's page per minute input requirements. Further, the CF printer's input buffer may be sized so that the CF printer's input buffer may hold a sufficient number of compressed image files to accommodate anticipated variations in DFE processing delays, variations in the actual file transfer rate of the physical interface between DFE processor 400 and CF printer 100, and variations in the decompression delay within the CF printer. In addition, initiation of the physical printing of print job by the print job by the CF printer may be delayed until the CF printer input buffer has been primed with a minimum number of decompressed raster images ready for submission the CF printer's print engine.

For example, in one exemplary CF printing system, the CF printer may include two input storage buffers. A first image storage buffer may store compressed, reduced resolution and/or raw raster images received via the physical interface between DFE processor 400 and CF printer. A second image storage buffer may store raster images that have been one of decompressed and/or expanded so that the images are ready for submission to the CF printer's print engine.

In such an exemplary embodiment, the static compression threshold value may be a value that, once the CF printer buffers are initially filled with ready-to-print raster image files, allows the CF printer to be supplied, with high confidence, a continuous flow of ready to print raster images from the above described second image storage buffer. Thus, the static compression threshold may be based on an anticipated average DFE to CF printer physical interface rate or throughput, and an anticipated average CF printer decompression rate or throughput, and the size of the first and second CFE buffers may be sized to accommodate anticipated variations in the actual throughput of the DFE to CF printer interface and/or the actual throughput of CF printer's decompression module, such that the buffer of ready to print raster images is never depleted during execution of an indefinitely long CF print job.

In an exemplary CF printing system that supports a dynamically determined compression threshold, the DFE and the CF printer may communicate with one another and share information related to one or more of: (1) DFE to CF printer physical interface throughput measurements; (2) CFE decompression unit throughput; and (3) the number of decompressed, raster images stored in the CF printer's buffers. The DFE may use the received information related to the actual status of DFE to CF printer image transfers, to recalculate a threshold compression ratio, and/or to recalculate a target DFE to CF printer raster image file size, needed to prevent the CF printer's buffer of decompressed, ready-to-print images from becoming empty and causing the CF printer to clutch.

For example, a compression threshold-determining unit may increase a threshold compression ratio, or may decrease a threshold compressed raster image file size, by a predetermined amount in response to the status information received. For example, in response to status information that the actual DFE to CF printer image transfer and/or CF raster file decompression rate is less that a previously reported value, and/or in response to status information that the actual CF printer decompression rate is less that a previously reported value, and/or in response to status information that the actual number of decompressed raster image files in the CF printer buffer has reduced, the DFE compression threshold-determining unit may increase the threshold compression ratio, or may decrease a threshold compressed raster image file size, by a predetermined amount so as to balance the transfer of files and to adjust the actual page-per-minute file transfer rate across the DFE/CF printer interface.

As described above with respect to FIG. 7 and FIG. 8, the standard halftoning process described with respect to step S708 may be any process that provides a raster image of suitable adequate image quality. The standard compression process described with respect to step S710 may be any compression process that, given the selected halftoning process used in step S708, provides a compressed raster image that meets a statically, or dynamically, determined compression ratio or maximum file size threshold value.

However, as described above with respect to FIG. 7 and FIG. 8, starting at step S713, should the compressed image file exceed a static or dynamically define transfer file size threshold, or fall below a static or dynamically defined compression ratio, one or more combinations of other, or alternate, DFE halftoning processes and/or other, or alternate, compression processes may be selected to bring the resulting compressed file size/compression ratio toward conformance with the defined compression ratio/file size threshold value.

For example, in a first exemplary embodiment, should the compressed image file exceed a static or dynamically define threshold, at step 712, the page objects are re-rendered by the image rendering unit using a reduced resolution halftoning process to produce a reduced resolution page raster image that contains half as many scanlines as the previously used standard halftoning approach, e.g. a 300 lpi by 600 spi buffer, rather than, for example, a 600 lpi by 600 spi buffer. During rendering, a reduced resolution halftoning process, e.g., via the reduced resolution halftoning process supported by reduced resolution halftoning unit 508, would be applied to page objects created by the raster image processing unit.

In such an embodiment, image objects may be rendered by copying only every other scanline into the image buffer. During compression, there is no need to throw away every other scanline in the image buffer, because these scanlines were never inserted into the buffer in the first place. "Compression" of the half-size image buffer may be achieved by simply copying only ever other scanline into the image buffers and inserting line repeat codes into the image data.

In transferring compressed reduced resolution, or raw images to CF printer 110, at step S726, the DFE processor 400, e.g., via CF printer interface unit 430, may communicate with CF printer 100 to inform CF printer 100 of the type of compression used. Therefore, on being notified that file being receive is, for example, a reduced resolution halftone image, a compressed image, or a raw image, decompression by CF printer 100 may be performed using a corresponding, or matching, decompression process.

In a second exemplary embodiment, should the compressed image file exceed a static or dynamically define threshold, at step 712, the page objects may be re-rendered by the image rendering unit by reducing the resolution of the generated halftoned image. For example, some DFE to CFE print engines include support for various resolution images, and the ability to magnify, or shrink, images by integer quantities. In the case where such a print engine exists in a system, the DFE can produce a half-sized image, as described in above. However, there is no need to "compress" the image by inserting line repeat codes into the data. Instead, the DFE processor 400 may instruct the CF print engine 100 to magnify the image in the needed direction, and may send the image to the print en as uncompressed.

In a third exemplary embodiment, for use in cases where physical interface bandwidth is severely constrained, a special "forced 4-to-1" halftone process, as addressed in greater detail below, may be used. There is of course a further loss in image quality when compared with an uncompressed image.

In a fourth exemplary embodiment, a "forced compression" halftoning process may be applied to the raster image by DFE process 400 and then a standard compression process may be applied to the halftoned image, rather than immediately executing a corresponding forced compression process. In this case, the standard compression may meet the compression target for the page raster image, by virtue of halftoned objects compressing better due to the application of the "forced compression" halftone. The advantage of such an approach is that the image quality of binary image objects may be preserved, because they are not halved in size during recompression. However, in cases where a given page contains heavy image content, but little synthetic content, the resulting compressed image size may exceed the compression threshold, and the DFE would then attempt one of several remaining alternate approaches.

In a fifth exemplary embodiment, in which several page raster images are assembled into a larger sheet image via a post-RIP imposition technique, the techniques described above may be applied to one or more of the page raster images. Further, it may be the case that the compression target for the assembled sheet can be met by applying the special "forced compression" halftone to some, but not all, of the page raster images prior to assembly. In cases where forced compression is used in addition to the special halftone, page raster images ultimately occupying the same sheet scan lines will be handled in the same way. During compression, it would therefore be possible to forcibly compress some of the scan lines, i.e., corresponding to the page raster images to be forced, but not for other scan lines for the page raster images that are not to be forced.

As described above with respect to FIG. 5, DFE processor 400 may support a variety of halftoning and compression processes. These processes may be used to produce a compressed binary halftoned image for transfer from DFE processor 400 to CF printer 100. Depending on the nature of the page raster image, certain halftoning processes when used to generate a raw, i.e., uncompressed, page raster image file may result in improvements in the compression ratio achieved, without significantly impacting image quality.

Figure 9:
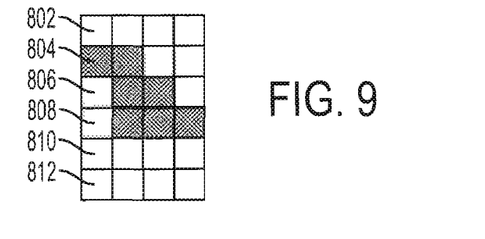
FIG. 9 represents an exemplary standard halftoned cell generated using a standard halftoning process.

For example, FIG. 9 presents an exemplary halftoned cell generated using a standard halftoning process. Each such exemplary cell has a grayscale value, which may be characterized as the ratio of dark to light pixels within the cell. For example, the halftoned cell shown in FIG. 9 has 24 pixels arranged % in a 6×4 matrix, each row in the matrix is labeled 802, 804, 806, 808, 810, and 812, respectively. As shown in FIG. 9, 7 of the 24 pixels are dark and 17 of the 24 pixels are light; however, only rows 804, 806 and 808 include dark pixels.

A standard compression process, as described above with respect to FIG. 7 and FIG. 8, at step S708, typically attempts to compress an image file without distorting the grayscale information associated with the respective halftoned cells. For example, the compressed page raster image process will attempt to maintain the overall grayscale ratio of the original halftoned cell in the resulting compressed halftoned cell. As a result, the compression ratios achieved with such non-lossy techniques are smaller than the compression techniques which are lossy, i.e., compression techniques which are not as concerned about preserving the grayscale values of the respective halftoned cells.

As described above with respect to FIG. 7 and FIG. 8, if a desired compression ratio is not achieved using a standard, non-lossy, compression process, other compression processes, such as forced compression or reduced resolution, may be used. Such compression processes are able to achieve greater compression ratios; however, these alternate compression processes are lossy, i.e., the resulting compressed file cannot be decompressed to achieve a page raster image which has the same cell level grayscale values as the original page raster image.

An n-to-1 forced compression process, such as the 2-to-1 and 4-to-1 compression processes described, above, achieve higher compression ratios than a standard compression approach by simply discarding rows within each halftoned cell, thereby resulting in a compressed file with reduced information. As a result, grayscale information associated with the original page raster image may be lost.

Figure 10:
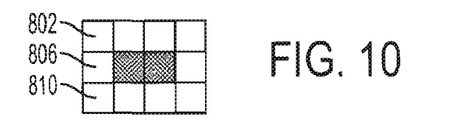
FIG. 10 represents an exemplary compressed version of the standard halftoned cell shown in FIG. 9 generated using a 2-to-1 forced compression process.

For example, FIG. 10 represents the same halftoned cell previously shown in FIG. 9, after compression using a forced 2-to-1 compression. As shown in FIG. 10, every other row, i.e., 804, 808 and 812, has been discarded. As a result, the ratio of dark pixels to light pixels has been altered i.e., the grayscale value of the cell has been altered. For example, only 2 of the 12 pixels in the compressed cell are dark, representing a grayscale ratio of 1-to-6, or 0.166, whereas the original halftoned cell had a grayscale ratio of 7-to-24, or 0.291. Since the original grayscale has been altered, and cannot be determined from the compressed cell, any image generated from the compressed cell will include the resulting grayscale error.

Figure 11:
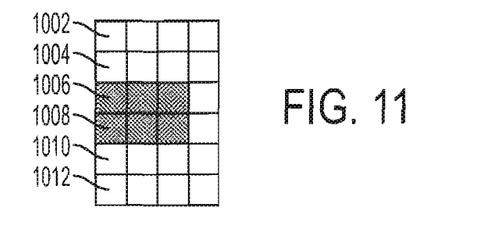
FIG. 11 represents an exemplary halftoned cell generated using an exemplary 2-to-1 halftoning process.

FIG. 11 presents an exemplary halftoned cell generated using an exemplary halftoning process which may be used in anticipation of compressing the halftoned cell with a forced 2-to-1 compression process. For example, the 2-to-1 halftoned cell shown FIG. 11 has 24 pixels arranged in a 6×4 matrix, each row in the matrix is labeled 1002, 1004, 1006, 1008, 1010, and 1012, respectively. As shown in FIG. 11, the cell is constructed so that adjacent scan lines have similar content, However, please note that only 6 of the possible 24 pixels are dark, demonstrating an initial loss of grayscale level information, as compared to the standard halftoned cell presented in FIG. 9.

Figure 12:
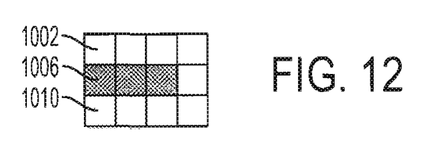
FIG. 12 represents an exemplary compressed version of the 2-to-1 halftoned cell shown in FIG. 11 generated using a forced 2-to-1 compression process.

FIG. 12 presents an exemplary compressed version of the 2-to-1 halftoned cell shown in FIG. 11 generated using a forced 2-to-1 compression process. Note that no additional loss of grayscale information has occurred as a result of the 2-to-1 compression process. For example, 6 of the 24 pixels in the uncompressed halftoned cell are dark, representing a grayscale value of 1-to-4, or 0.25. However, the compressed cell shown in FIG. 12, compressed using the same 2-to-1 compression approach used to compress the cell addressed above with respect to FIG. 10, demonstrates the same grayscale value as the uncompressed halftoned cell shown in FIG. 11. Specifically, the compressed cell shown in FIG. 12 has a grayscale value of 3-to-12, or 0.25.

Figure 13:
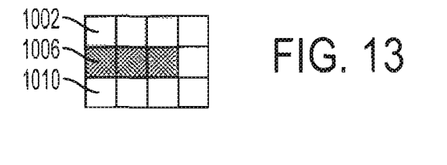
FIG. 13 represents an exemplary reduced resolution version of the 2-to-1 halftoned cell shown in FIG. 11 generated using a reduced resolution process.

FIG. 13 presents an exemplary reduced resolution version of the 2-to-1 halftoned cell shown in FIG. 11 generated using a reduced resolution process. A reduced resolution halftone may be used when rendering page objects at reduced resolution. The resulting raw bitmap is a fraction of the size of the bitmap that corresponds to a print-engine resolution image. Then, a compression operation may be applied to the reduced-resolution image, which may have the result of making the compressed file size even smaller. A disadvantage of rendering pages at low resolution is that all page objects suffer the image quality impact of low resolution. On the other hand, if special force compression halftones are employed at the standard resolution, only halftoned page objects will be impacted, from an image quality standpoint. Since the original halftoned cell shown in FIG. 11 is symmetrical, application of a reduced resolution approach also results in a compressed cell that maintains the grayscale value of the original 2-to-1 halftoned cell shown in FIG. 1.

As demonstrated above, although application of the above described 2-to-1 halftoning as opposed to standard halftoning techniques may result in mild distortion of grayscale features of a cell, the resulting compressed image file, compressed with a 2-to-1 compression technique results in a reduction in the overall grayscale distortion of the cell.

Therefore, in cases where forced compression is required, in order to achieve a required compression ratio as described above with respect to the physical interface between DFE processor 400 and CF printer 100, the required compression ratio may be achieved with minimal distortion to the final compressed halftoned cell, by first rendering the page objects using an n-to-1, e.g., 2-to-1, 4-to-1, etc., halftoning process, as described above, in anticipation of compression with a compression process selected from a plurality of possible compression processes. Such compression processes may include, but are not limited to, a standard compression process, a forced n-to-1 compression process, e.g., 2-to-1, 4-to-1, etc., or others.

Forced 4-to-1 compression may be achieved in several ways. For example, a 4-to-1 halftoned image may be compressed by throwing away 3 out of every 4 scanlines, or by throwing out every other scanline and every other pixel, represented in FIGS. 8 and 10 as columns in the halftoned cells. In other words, the invention can apply equally well in two dimensions of an image.

The exemplary embodiments described above, including the halftoning processes used, the compression processes used, and the pairing of halftoning processes and/or compression process, are exemplary only. Any number of standard, forced-compression, reduced resolution, or other halftoning processes may be used. Further, any number of standard, forced compression, or other compression processes may be used. In addition, these halftoning processes and compression processes may be combined in any manner desired to generate page raster images for inclusion in a transmission stream that meets the average page-per-minute throughput requirements of a CF printer or other device.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A digital front end processor comprising:
   a controller;
   a raster image processing unit that receives page data related to a page to be printed and generates page objects that define features for printing on the page;
   an image rendering unit that receives the page objects from the raster image processing unit and generates a first page raster image based on the received page objects and a first halftoning process;
   an image compression unit that receives the first page raster image from the image rendering unit and generates a first compressed page raster image using a first compression process; and
   a physical interface with a continuous feed printer across which the processor selectively transmits one of the first page raster image, the first compressed page image and a second compressed page image to a continuous feed printer,
   wherein the controller determines at least one of whether a compression ratio of the first compressed page image produced by the image compression unit is below a predetermined compression ratio and whether a size of the first compressed page image is above a predetermined compressed page image size,
   based on the determination, the controller selectably instructs the image rendering unit to generate a second page raster image based on the generated page objects generated by the raster image processing unit for the page to be printed and a second halftoning process, and instructs the image compression unit to generate the second compressed page image based on the second page raster image and a second compression process,
   the controller determines at least one of whether a compression ratio of the second compressed page image produced by the image compression unit is below the predetermined compression ratio and whether the size of the second compressed page image is above the predetermined compressed page image,
   when the at least one of the compression ratio of the second compressed page image is below the predetermined compression ratio and the size of the second compressed page image is above the predetermined compressed page image, the controller instructs the image rendering unit to generate a third page raster image based on the generated page objects for the page to be printed and a third halftoning process, and instructs the image compression unit to generate the third compressed page image based on the third page raster image and a third compression process, and
   the physical interface transmits the third compressed page image to the continuous feed printer.

2. The digital front end processor of claim 1, wherein at least one of the predetermined compressed page image compression ratio and the predetermined compressed page image size is a static predetermined parameter.

3. The digital front end processor of claim 1, further comprising:
   a compression threshold determining unit that dynamically determines at least one of the predetermined compressed page image compression ratio and the predetermined compressed page image size based on performance parameters related to the physical interface with the continuous feed printer.

4. The digital front end processor of claim 3, wherein the performance parameters include at least one of:
   a number of unprinted page raster images stored in input buffers of the continuous feed printer;
   a storage capacity of page raster image input buffers within the continuous feed printer;
   an average page-per-minute output rate of the continuous feed printer;
   a measured page-per-minute transfer rate across the physical interface with the continuous feed printer;
   an average page-per-minute transfer rate across the physical interface with the continuous feed printer;
   a measured bit-per-second transfer rate across the physical interface with the continuous feed printer; and
   an average bit-per-second transfer rate across the physical interface with the continuous feed printer.

5. The digital front end processor of claim 1, wherein the raster image processing unit receives page data in the form of page description language data.

6. The digital front end processor of claim 1, further comprising:
   a network interface to a data network;
   wherein the received page data is received from a source device via the data network.

7. The digital front end processor of claim 1, wherein the first halftoning process preserves grayscale information.

8. The digital front end processor of claim 1, wherein the second halftoning process constructs halftone cells so that adjacent scan lines have similar content.

9. The digital front end processor of claim 1, wherein the first compression process preserves grayscale information.

10. The digital front end processor of claim 1, wherein the second compression process removes rows from a rendered image and replaces the removed line with a line repeat code.

11. A continuous feed printing system comprising:
    a digital front end processor as described in claim 1; and
    a continuous feed printer that receives page raster images from the digital front end processor.

12. A continuous feed marking system comprising:
    a digital front end processor as described in claim 1; and
    a continuous feed printer that receives page raster images from the digital front end processor.

13. A method for providing page raster images to a continuous feed printer, comprising:
    receiving page data related to a page to be printed;
    generating page objects, based on the received page data, that define features for printing on the page to be printed;

generating a first page image based on the generated page objects and a first halftoning process;

compressing the first page image using a first compression process to produce a first compressed page raster image;

determining at least one of whether a compression ratio of the first compressed page image is below a predetermined compression ratio and whether a size of the first compressed page image is above a predetermined compressed page image size, and, based on the determination, selectively generating a second page image based on the generated page objects generated from the received page data and a second halftoning process and generating a second compressed page image based on the second page image and a second compression process;

transmitting one of the first page image, the first compressed page image and the second compressed page image to a continuous feed printer, determining at least one of whether a compression ratio of the second compressed page image is below the predetermined compression ratio and whether the size of the second compressed page image is above the predetermined compressed page image, when the at least one of the compression ratio of the second compressed page image is below the predetermined compression ratio and the size of the second compressed page image is above the predetermined compressed page image, generating a third page image based on the generated page objects generated from the received page data and a third halftoning process, and generating a third compressed page image based on the third page image and a third compression process; and transmitting the third compressed page image to the continuous feed printer.

14. The method of claim 13, wherein at least one of the predetermined compression ratio and the predetermined page image size is a static predetermined parameter.

15. The method of claim 13, further comprising:
dynamically determining at least one of the predetermined compression ratio and the predetermined compressed page image size based on performance parameters related to the physical interface with the continuous feed printer.

16. The method of claim 15, wherein the performance parameters include at least one of:
a number of unprinted page raster images stored in input buffers of the continuous feed printer;
a storage capacity of page raster image input buffers within the continuous feed printer;
an average page-per-minute output rate of the continuous feed printer;
a measured page-per-minute transfer rate across the physical interface with the continuous feed printer;
an average page-per-minute transfer rate across the physical interface with the continuous feed printer;
a measured bit-per-second transfer rate across the physical interface with the continuous feed printer; and
an average bit-per-second transfer rate across the physical interface with the continuous feed printer.

17. The method of claim 13, wherein the received page data is in the form of page description language data.

18. The method of claim 13, wherein the received page data is received from a source device via a data network.

19. The method of claim 13, wherein the first halftoning process preserves grayscale information.

20. The method of claim 13, wherein the second halftoning process constructs halftone cells so that adjacent scan lines have similar content.

21. The method of claim 13, wherein the first compression process preserves grayscale information.

22. The method of claim 13, wherein the second compression process removes rows from a rendered image and replaces the removed line with a line repeat code.

* * * * *